(12) United States Patent
Kiukkonen

(10) Patent No.: US 7,446,704 B2
(45) Date of Patent: Nov. 4, 2008

(54) DUAL FREQUENCY RECEPTION OF SPREAD SPECTRUM SIGNALS

(75) Inventor: Niko Kiukkonen, Veikkola (FI)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 11/664,228

(22) PCT Filed: Oct. 1, 2004

(86) PCT No.: PCT/IB2004/003200

§ 371 (c)(1),
(2), (4) Date: Mar. 30, 2007

(87) PCT Pub. No.: WO2006/038050

PCT Pub. Date: Apr. 13, 2006

(65) Prior Publication Data

US 2008/0036643 A1 Feb. 14, 2008

(51) Int. Cl.
*G01S 1/02* (2006.01)
*G01S 5/00* (2006.01)
(52) U.S. Cl. .................. 342/357.12; 342/350
(58) Field of Classification Search .......... 342/83, 342/98, 102, 350, 357.06, 357.12
See application file for complete search history.

(56) References Cited

U.S. PATENT DOCUMENTS

| 5,678,169 A | 10/1997 | Turney et al. |
| 5,805,108 A | 9/1998 | Lennen et al. |
| 5,883,597 A | 3/1999 | DeWulf et al. |
| 6,448,926 B1 | 9/2002 | Weinberg et al. |
| 6,675,003 B1 | 1/2004 | Dubash et al. |
| 2002/0193108 A1 | 12/2002 | Robinett |
| 2004/0102172 A1 | 5/2004 | Hendin |

OTHER PUBLICATIONS

The Global Positioning System: Present Status and Modernization Plans Mar. 24, 2003; http://www.gps.oma.be/common/modern.html.
"The New L2 Civil Signal" By Richard Fontana, published Apr. 13, 2004, pp. 1-15.

*Primary Examiner*—Dao L Phan

(57) ABSTRACT

Dual frequency reception is shown in which a receive signal is obtained that contains a first signal with a first center frequency $f_1$ and a second signal with a second center frequency $f_2$. The receive signal is processed to generate an output signal. One or more types of the output signal can be generated. A first type of the output signal is proportional to the sum of the first signal frequency-converted to a third center frequency $f_3$ and the second signal frequency-converted to said third center frequency $f_3$. The first and second signals may for instance be positioning signals in a dual frequency satellite-based positioning system.

31 Claims, 3 Drawing Sheets

DUAL FREQUENCY RECEPTION OF SPREAD SPECTRUM SIGNALS

CROSS-REFERENCE TO RELATED APPLICATION

This application is in the U.S. National Stage of International Application Number PCT/IB/2004/003200 filed Oct. 1, 2004 published Apr. 13, 2006 under International Publication Number WO 2006/038050 A1 in the English language.

FIELD OF THE INVENTION

This invention relates to a method, a computer program, a computer program product, a receiver and a module for dual frequency reception. The invention further relates to a transmitter in a system with dual frequency reception and said system itself.

BACKGROUND OF THE INVENTION

Dual frequency reception is of particular relevance in receivers of satellite-based positioning systems such as the Global Positioning System (GPS) and the forthcoming Galileo system.

The GPS system uses 24 satellites, distributed over 6 orbital planes 20.200 km above the Earth. The satellites take 12 sidereal hours to orbit the earth.

All GPS satellites emit signals on 2 frequencies: L1 (1575.42 MHz) and L2 (1227.6 MHz). Three pseudo random noise (PRN) ranging codes are currently in use:

- The coarse/acquisition (C/A) code modulates the L1 carrier, which carries the navigation message, and has a 1.023 MHz chip rate and a period of 1 ms
- The precision (P) code modulates L1 and L2 carriers (P1, P2) and has a 10.23 MHz rate and a period of 7 days
- The Y-code is presently used in place of the P-code (the Y-code is obtained by coding the P-code with a W-code that is only known to authorized users) because anti-spoofing (AS) is activated since 1994. The corresponding observables are Y1 and Y2.

In the scope of the modernization of the GPS, a new L2 Civil signal (L2C) will be transmitted by modernized IIR (IIR-M) and all subsequent GPS satellites. Then both the L1 and the new L2C signal will be available to civil (non-authorized users). Furthermore, a third civil signal L5 will be transmitted on a third carrier at 1176.5 MHz.

GPS receivers can be hand-carried or installed e.g. on aircraft, ships, tanks, submarines, cars, and trucks. These receivers detect, decode, and process GPS satellite signals. They must lock onto the signals from four of the GPS satellites to give a full three-dimensional position.

Different types of receivers make use of different parts of the GPS signal structure. The basic observable at a GPS receiver is currently the C/A-code on the L1 carrier. The signals allow the GPS receiver to calculate the distances to four satellites, and with that data, it can calculate a stand-alone position on the Earth's surface in latitude and longitude within +/−100 meters 95% of the time. Since the four signals received are stabilized by atomic clocks, the timing accuracy of an ordinary digital clock is sufficient for the calculations done in the GPS receiver unit. This is achieved by exploiting the fact that only three satellite signals are actually required to determine the position of the GPS receiver, and by using the additional degree of freedom represented by the fourth received satellite signal to correct for timing errors induced by the low-quality digital clock used by the GPS receiver.

When the GPS receiver receives a PRN code from a satellite, it generates a plurality of replica codes and correlates the received PRN code with the plurality of replica codes. The replica codes that achieves the highest correlation identifies the transmitting satellite, and the time interval by which this replica code must be shifted in the receiver to maintain maximum correlation with the received PRN code, multiplied by the speed of light, is approximately equal to the satellite range. The corresponding position of the satellite can be extracted from an almanac that is implemented into the GPS receiver. The satellite range is called the pseudo range because the measurement must be corrected by a variety of factors to obtain the true range. The corrections that must be applied include signal propagation delays caused by the ionosphere and the troposphere, the satellite clock error, and the GPS receiver clock error. The true geometric distance to each satellite is obtained by applying these corrections to the measured pseudo range.

By using dual frequency phase measurements, and knowledge of the inverse square relationship between the group delay and the frequency of each carrier (for instance, L1 and L2), a simple linear correction of the delay induced by the ionosphere can be derived. This correction can be expressed as follows:

$$\tau_{L1} = 1.5336 \cdot \Delta\tau_{L1,L2}$$

where $\tau_{L1}$ is the ionospheric delay on carrier L1 and $\Delta\tau_{L1,L2}$ is the difference in delay between L1 and L2.

In order to increase the accuracy of satellite-based positioning, a GPS receiver thus has to receive both the L1 and the L2 carrier (or other combinations of L1, L2 and L5 in the future, as for instance L2 and L5), requiring two complete receiver structures to be implemented into the GPS receiver, and thus increasing both the size and costs of the GPS receiver.

To alleviate this problem, U.S. Pat. No. 6,675,003 B1 proposes a mixer structure that is capable of frequency converting both the L1 and the L2 signals. To this end, the received L1 signal is frequency-converted to a first intermediate frequency, and the received L2 signal is frequency converted to a second Intermediate Frequency (IF). The obtained IF signals are then simultaneously frequency-converted to final IF with a single Image Reject (IR) mixer that uses a mixer frequency that is approximately between said first and second IFs. This IR mixer can either produce the L1 signal converted to said final IF at a first output and the L2 signal frequency-converted to said final IF at a second output, or switch between the L1 signal converted to said final IF and said L2 signal frequency-converted to said final IF, wherein this switched signal is output via a single output of said IR mixer.

However, the mixer structure proposed in U.S. Pat. No. 6,675,003 B1 still requires two mixers for the Radio Frequency (RF) to IF conversion and, to accomplish the switching, furthermore reveals a rather complicated architecture.

SUMMARY OF THE INVENTION

In view of the above-mentioned problems, the present invention thus proposes a method, a computer program, a computer program product, a system, a transmitter, a receiver and a module for efficient dual frequency reception.

It is proposed a method for dual frequency reception, comprising obtaining a receive signal that contains a first signal with a first center frequency $f_1$ and a second signal with a second center frequency $f_2$, and processing said receive signal to generate an output signal, wherein one or more types of said output signal can be generated, and wherein a first type of said output signal is proportional to the sum of said first signal frequency-converted to a third center frequency $f_3$ and said second signal frequency-converted to said third center frequency $f_3$.

Said receive signal has been transmitted by one or several transmitters and is received at a receiver. Said receive signal contains a first signal with a first center frequency and a second signal with a second center frequency and thus can be considered as dual frequency signal. Said signals may for instance represent modulated and possibly spread information-carrying symbols, and said center frequency may for instance be the frequency of the modulating carrier. For instance, said first and second signals may be two out of the three signals transmitted on the L1, L2 and L5 carriers of the Global Positioning System (GPS), respectively, and then said first and second signal have been transmitted by one transmitter (satellite). Equally well, said first and second signals may be generated by different transmitters (satellites), for instance satellites of different positioning systems such as GPS and Galileo. Irrespective of their origin, from said receiver's point of view, said first and second signals are superposed in said receive signal that is obtained by said receiver.

To obtain said receive signal, said receiver may deploy one or more antennas, for instance a dual-frequency antenna or two separate antennas tuned to the frequency of the first and second signal, respectively, may be used. Said obtaining of said receive signal may further comprise filtering of the signals received by the at least one antenna, and if reception and/or filtering is performed in two branches of the receiver, also a combination of the signals of both branches to obtain said receive signal that contains said first and second signal may be required.

Said receive signal is then subject to further processing to generate said output signal, wherein one or more types of output signals can be generated. Which type of said output signals is actually generated may for instance be adaptively determined by said receiver based on characteristics of said receive signal and said first and second signal contained therein.

A first type of said one or more types of output signal that can be generated is proportional to the sum of said first signal frequency-converted to a third center frequency $f_3$ and said second signal frequency-converted to said third center frequency $f_3$. Said signals are frequency converted by shifting the center frequencies of said signals. Said first center frequency $f_1$ of said first signal then is shifted to said third center frequency $f_3$, and correspondingly the second center frequency $f_2$ of said second signal is shifted to said third center frequency $f_3$. Said frequency conversion may for instance be accomplished by a mixer, and both up-conversion, i.e. shifting the center frequency to a higher frequency, and down-conversion, i.e. shifting the center frequency to a lower frequency, might be possible.

According to an embodiment of the present invention, said dual frequency receive signal is processed to generate an output signal that is proportional to the sum of said first frequency-converted to said third center frequency $f_3$ and said second signal frequency-converted to said third center frequency $f_3$. When frequency-converting said first and second signal component, it is thus tolerated that both frequency-converted signals superpose in the output signal, which allows for an extremely simple structure of the mixer that performs the frequency-conversion. For instance, said mixer may only consist of a local oscillator that generates a frequency of a sinusoid that is multiplied with said receive signal that contains both said first and second signal. To detect and/or recover the frequency-converted first and second signals superposed in said output signal, characteristics of said first and second signals may be exploited, for instance the property that said signals are spread spectrum signals that have been spread with different spreading codes. To perform this detection and/or recovery, it may be required to further frequency-convert said output signal to a base-band frequency, if not already said third center frequency $f_3$ to which said superposition of said first and second signal is frequency-converted functions as base band frequency.

According to an embodiment of the present invention, at least two types of output signals can be generated, and a second type of said output signal is substantially one of said first signal frequency-converted to said third center frequency $f_3$, and said second signal frequency-converted to said third center frequency $f_3$.

This embodiment advantageously allows to choose between two output signals, wherein the first type of said output signal is proportional to the sum of the first signal frequency-converted to said third center frequency $f_3$ and the second signal frequency-converted to said third center frequency $f_3$, and the second type of said output signal is substantially said first signal frequency-converted to said third center frequency $f_3$, or substantially said second signal frequency-converted to said third center frequency $f_3$. It is then possible to choose between dual frequency reception, where both signals are present in the output signal, or single frequency reception, where only substantially one of said two signals is present in the output signal. Therein, it may further be possible to select if said second type of said output signal shall be substantially said first signal frequency-converted to said third center frequency $f_3$ or said second signal frequency converted to said third center frequency $f_3$.

According to an embodiment of the present invention, said processing to generate said first type of said output signal comprises multiplying said receive signal with a sinusoid that has a fourth center frequency $f_4$ to obtain said first type of said output signal. Said sinusoid may for instance be a cosine function with argument $2\pi f_4$. Said fourth center frequency $f_4$ may for instance be chosen in dependence on said first and second center frequencies. Apparently, this embodiment of the present invention allows for an extremely simple set-up of the frequency-conversion of both the first and second signal.

According to an embodiment of the present invention, $$f_1 \geq f_2,$$
$$f_4 = f_2 + \frac{f_1 - f_2}{2}$$
and
$$f_3 = f_1 - f_4$$

hold. In this case, the fourth center frequency $f_4$ then is located between said first and second center frequencies, causing a superposition of the first signal and the second signal at the third center frequency $f_3 = f_1 - f_4$, when said receive signal is multiplied with said sinusoid with said fourth center frequency $f_4$.

According to an embodiment of the present invention, said processing to generate said second type of said output signal comprises multiplying said receive signal with a first sinusoid that has a fourth center frequency $f_4$ to obtain a first mixed signal, multiplying said receive signal with a second sinusoid to obtain a second mixed signal, wherein said second sinusoid has the same center frequency $f_4$ as said first sinusoid and differs from said first sinusoid by a first phase shift, phase shifting one of said first and second mixed signals with a second phase shift to obtain a phase-shifted mixed signal, and combining said phase-shifted mixed signal and said other mixed signal to obtain said second type of said output signal.

Depending on the choice of said fourth center frequency $f_4$, the choice of said first and second phase shift and the way in which said phase-shifted mixed signal and said other mixed signal are combined, it can be accomplished that either substantially said first or substantially said second signal are frequency converted to said third center frequency $f_3$.

This embodiment of the present invention is particularly advantageous because, due to the fact that the first step of mixing the receive signal with a first sinusoid is required for both the generation of said first type of output signal and said second type of said output signal, its implementation allows for a structure that is suited for the generation of both the first and second type of output signal, and, with respect to the second type of output signal, also allows to selectively generate substantially said first or second signal frequency-converted to said third center frequency $f_3$ as second-type output signal. To this end, this implementation only has to be furnished with corresponding control facilities that set the phase shifts and signs of the combining and tap the desired first- or second-type output signal at the correct position in the implementation.

According to an embodiment of the present invention, $$f_1 \geq f_2,$$
$$f_4 = f_2 + \frac{f_1 - f_2}{2}$$
and
$$f_3 = f_1 - f_4$$

hold. In this case, the fourth center frequency $f_4$ then is located between said first and second center frequencies. It is then possible, for instance if said first phase shift is $$-\frac{\pi}{2}$$

(e.g. said first sinusoid is a cosine, and said second sinusoid is a sine), if said second phase shift equals $$\frac{\pi}{2}$$

and is applied to said first mixed signal, and if said phase-shifted mixed signal and said other signal are combined by adding said phase-shifted mixed signal and said other signal, that substantially only a frequency-converted representation of said first signal is present at said third center frequency $f_3$. By changing said first and/or second phase shift, and/or by exchanging the mixed signals to which said second phase shift is applied, and/or by changing the signs of said combining of said phase-shifted mixed signal and said other mixed signal, it can also be achieved that substantially only a frequency-converted representation of said second signal is present at said third center frequency $f_3$. Due to imperfect implementation and imperfect timing, the presence of strongly attenuated components of the first signal at said third center frequency $f_3$ may not be avoidable, and thus "substantially" only a frequency-converted representation of said second signal is present at said third center frequency $f_3$.

According to an embodiment of the present invention, said first phase shift equals $$\frac{\pi}{2}.$$

According to an embodiment of the present invention, said second phase shift equals $$\pm\frac{\pi}{2}.$$

According to an embodiment of the present invention, said phase-shifted mixed signal and said other mixed signal are combined by one of addition and subtraction.

According to an embodiment of the present invention, said second type of said output signal is substantially said first signal frequency-converted to said third center frequency $f_3$, a quality of said first signal is determined, and it is determined at least in partial dependence on said determined quality which of said at least two types of said output signal is generated as output signal.

Said quality of said first signal may for instance be a signal-to-noise ratio, or a signal-to-noise-and-interference ratio, or a power level, or any other measure related to the characteristics of said first signal. Said quality of said first signal, which is contained in said receive signal, may for instance be determined by isolating said first signal from said receive signal by filtering and subsequently examining the filtered receive signal.

This embodiment is particularly advantageous if said first signal is considered as a main signal, if said second signal is considered as an auxiliary signal, and if said summing of said first and second signal when being frequency-converted to said third center frequency $f_3$ in said output signal causes a degradation of said first signal with respect to further processing, for instance because an imperfect separation of said first and second signal in said output signal adds some noise to said first signal. It may then be advisable to decide depending on said determined quality of said first signal if said first (main) signal can sustain a degradation of its quality and be still of use for further processing, or if this degradation is not acceptable. This decision can be based on a comparison of said determined quality with a threshold, which may be fixed or adaptively determined. If said determined quality is large enough, said first type of output signal may be selected for generation, and then, in addition to the first (main) signal, also the second (auxiliary) signal may be processed. In a GPS system, for instance said first signal may be an L1 signal, and said second signal may be an L2 signal, and if the quality of said L1 signal is large enough, it may be decided that dual frequency reception of the L1 and L2 signals is performed (first type of output signal), so that an increased accuracy of the positioning is achieved. In contrast, if the quality of the L1 signal is found insufficient, only said L1 signal may be received (second type of output signal) in order not to further degrade the quality of the L1 signal by an imperfect separation from the L2 signal.

According to an embodiment of the present invention, said first type of said output signal is generated if said determined quality is above a threshold value. This value may either be fixed or adaptively determined.

According to an embodiment of the present invention, said processing to generate an output signal is performed by a mixer that frequency-converts an input signal by a frequency difference $f_{LO}$ to an intermediate frequency $f_{IF}$ and can be controlled to reduce an influence of an image signal on said frequency down-converted input signal, and said image signal has a center frequency equaling one of $f_{LO}-f_{IF}$ and $f_{LO}+f_{IF}$.

Said mixer may for instance be an image rejection mixer, which performs frequency conversion of an input signal to an intermediate frequency $f_{IF}$ and reduces or completely suppresses an influence of an image signal contained in said input signal at a frequency of $f_{LO}-f_{IF}$ and $f_{LO}+f_{IF}$. In this embodiment of the present invention, said image rejection mixer is modified to be controllable, so that the reduction or suppression of said image signal can be turned on or off.

According to an embodiment of the present invention, said receive signal is used as input signal for said mixer, $$f_1 \geq f_2,$$

$$f_{LO} = f_2 + \frac{f_1 - f_2}{2}$$

and $$f_{IF} = f_3 = f_1 - f_{LO}$$

hold, said first type of said output signal is generated by controlling said mixer not to reduce said influence of said image signal on said frequency down-converted input signal, and said second type of said output signal is generated by controlling said mixer to reduce said influence of said image signal on said frequency down-converted input signal.

The receive signal containing said first and second signal is used as input signal for the image rejection mixer, and the mixer frequency $f_{LO}$ is chosen to be located in the middle between the first center frequency $f_1$ and the second center frequency $f_2$. Then, with respect to the first signal, the second signal represents said image signal, and similarly, with respect to the second signal, said first signal represents said image signal.

If said image rejection of said mixer is turned off, then multiplying said receive signal with a cosine with a center frequency $f_{LO}$ frequency-converts said first signal to said intermediate (or third frequency) $f_{IF}=f_3$, and also converts said second signal to said intermediate $f_{IF}$, so that both signals are superposed in the output signal.

If said image rejection is turned on, and if said image rejection is controlled to reduce or suppress said second signal, a first branch of said image rejection mixer generates a signal that equals the output signal in the above-stated case that no image rejection is performed, and a second branch of said image rejection mixer generates a signal that, when added to said signal of said first branch to obtain said output signal, reduces or suppresses the frequency-converted version of said second signal at the intermediate frequency $f_{IF}$, so that said output signal then substantially only contains said first signal frequency-converted to the intermediate frequency $f_{IF}$. Similarly, said image rejection mixer may be controlled to reduce or suppress said first signal, and then, when image rejection is turned on, said output signal substantially only contains said second signal frequency-converted to said intermediate frequency $f_{IF}$.

This embodiment of the present invention is particularly advantageous as the same image rejection mixer can be used to generate both types of output signal and, if it can be controlled to select which of the first and second signal is considered as image signal and thus is reduced or suppressed, also allows to select between the two alternatives of the second type of said output signal.

According to an embodiment of the present invention, said frequency difference $f_{LO}$ is tunable. This is particularly advantageous if dual frequency reception of signals is desired that do not always have the same center frequencies. For instance, in one situation, dual frequency reception of an L1 and an L2 signal of a GPS system may be desired, which have center frequencies of 1575.4 MHz and 1227.6 MHz, respectively, and in another situation, dual frequency reception of an L1 signal of a GPS system with a center frequency of 1575.4 MHz and a signal from a Galileo system with a center frequency being different from 1227.6 MHz may be desired. For the mixer frequency $f_{LO}$ to be positioned in the middle of the two center frequencies of the signals that are to be jointly received according to the present invention, it is then required for $f_{LO}$ to be variable in a certain range.

According to an embodiment of the present invention, said obtaining of said receive signal comprises receiving a signal that contains said first and second signal with a first antenna to obtain a first received signal, wherein said first antenna is at least partially adapted to said first signal, receiving a signal that contains said first and second signal with a second antenna to obtain a second received signal, wherein said second antenna is at least partially adapted to said second signal, filtering said first received signal with a first filter structure at least partially adapted to said first signal to obtain a first filtered signal, filtering said second received signal with a second filter structure at least partially adapted to said second signal to obtain a second filtered signal; and combining said first and second filtered signals to obtain said receive signal. Said antennas may for instance be tuned to have a reception maximum at the center frequencies of the respective signals, and said filter structures may be designed to have a pass band being equal to or larger than the bandwidth of said respective signals and a stop-band for noise and interference suppression elsewhere.

According to an embodiment of the present invention, said first filter structure comprises a band-pass filter, and said second filter structure comprises a combination of a low-pass and a high-pass filter. The quality of said combination of a low-pass and a high-pass filter may be lower than that of said band-pass filter, but said combination may be less expensive than said single filter and may be sufficient for the filtering of a signal that is only considered in situations when the quality of the first and/or second signal is high anyway.

According to an embodiment of the present invention, said obtaining of said receive signal comprises receiving a signal that contains said first and second signal with a dual frequency antenna to obtain a received signal, filtering said received signal with a first filter structure at least partially adapted to said first signal to obtain a first filtered signal, filtering said received signal with a second filter structure at least partially adapted to said second signal to obtain a second filtered signal; and combining said first and second filtered signals to obtain said receive signal.

According to an embodiment of the present invention, said output signal is frequency converted to a base band center frequency. Said base band center frequency is significantly smaller than said third center frequency $f_3$. Said frequency-conversion to said base band center frequency may allow to detect said first and/or second signal and/or to reconstruct the information contained in said first and/or second signal.

According to an embodiment of the present invention, said first and second signals are spread spectrum signals that have been spread with different spreading codes, respectively. Said spreading codes are sequences of chips, e.g. ones and zeroes or positive and negative ones, wherein said chips have a fixed chip duration each, and wherein the chip duration of said chips is much smaller than the duration of an information-carrying symbol that is to be spread. Spreading then may be achieved by multiplying information-carrying symbols with a sequence of chips, thus increasing the bandwidth (spectrum) of the spread symbols, which then can be denoted as spread spectrum signals. If two different spreading codes are used to spread two different sequences of information-carrying symbols, said two obtained spread spectrum signals may be orthogonal or pseudo-orthogonal with respect to each other, depending on the cross-correlation properties of the used spreading codes. It is then possible to add both spread spectrum signals and to recover both sequences of information-carrying symbols from the sum signal by de-spreading with the corresponding spreading code, wherein said de-spreading is achieved by code-matched filtering, i.e. multiplying the sum signal with one of the spreading codes and integrating the obtain sequence of chips over periods corresponding to the symbol duration. In a GPS system, for instance, all three signals L1, L2/L2C and L5 are spread spectrum signals that have been spread with different spreading codes, respectively. The same holds for the signals used in the Galileo system.

According to an embodiment of the present invention, said output signal is frequency converted to a base band center frequency to obtain a base band signal, and wherein said first and second signals are detected in said base-band signal by correlation with their corresponding spreading codes. At said base band center frequency, to which said output signal may for instance be frequency converted by a further mixer, it is possible to detect the first and second signal that have been superposed during the frequency-conversion to said third center frequency $f_3$ by means of correlation. The quality of said detection depends on the cross-correlation properties of the codes that were used for the spreading of said spread spectrum signals. It then may further be possible to recover the contents of said first and/or second signal from said base band signal by means of de-spreading.

According to an embodiment of the present invention, said first and second signals are transmitted to said receiver by at least one transmitter of at least one satellite-based positioning system. Said transmitter may for instance be a satellite. Said first and second signal may be transmitted by the same transmitter of the same positioning system, or by different transmitters of the same positioning system, or by different transmitters of different positioning systems.

According to an embodiment of the present invention, said at least one satellite-based positioning system comprises at least one of the Global Positioning System and the Galileo system.

According to an embodiment of the present invention, said first frequency $f_1$ equals 1575.4 MHz, and said second frequency $f_2$ is in the range between 1176 and 1227 MHz.

This allows for a reception of the L1 signal of the GPS system, and for one signal out of the L2 signal of the GPS system or signals of the Galileo system.

It is further proposed a computer program with instructions operable to cause a processor to control a receiver that performs the above-mentioned method steps.

It is further proposed a computer program product comprising a computer program with instructions operable to cause a processor to control a receiver that performs the above-mentioned method steps.

It is further proposed a system for transmitting signals, comprising at least one transmitter, and at least one receiver, wherein said at least one transmitter comprises means arranged for transmitting a signal that contains a first signal with a first center frequency f and a second signal with a second center frequency $f_2$, and wherein said at least one receiver comprises means arranged for obtaining a receive signal that contains said first and second signal, and means arranged for processing said receive signal to generate an output signal, wherein one or more types of said output signal can be generated, and wherein a first type of said output signal is proportional to the sum of said first signal frequency-converted to a third center frequency $f_3$ and said second signal frequency-converted to said third center frequency $f_3$.

Said system may for instance be the GPS system or the Galileo system.

It is further proposed a transmitter in a system for transmitting signals, comprising means arranged for transmitting a signal that contains a first signal with a first center frequency and a second signal with a second center frequency, wherein a receive signal that contains said first and second signal is obtained by at least one receiver, wherein said receive signal is processed at said at least one receiver to generate an output signal, wherein one or more types of said output signal can be generated, and wherein a first type of said output signal is proportional to the sum of said first signal frequency-converted to a third center frequency $f_3$ and said second signal frequency-converted to said third center frequency $f_3$.

Said transmitter may for instance be a satellite in a satellite-based positioning system, as for instance the GPS or the Galileo system.

It is further proposed a receiver for dual frequency reception, comprising first means arranged for obtaining a receive signal that contains a first signal with a first center frequency $f_1$ and a second signal with a second center frequency $f_2$, second means arranged for processing said receive signal to generate an output signal, wherein one or more types of said output signal can be generated, and wherein a first type of said output signal is proportional to the sum of said first signal frequency-converted to a third center frequency $f_3$ and said second signal frequency-converted to said third center frequency $f_3$.

According to an embodiment of the present invention, said second means comprises means arranged for multiplying said receive signal with a sinusoid that has a fourth center frequency $f_4$ to obtain a first mixed signal; and means arranged for outputting said first mixed signal as said first type of said output signal.

According to an embodiment of the present invention, at least two types of output signals can be generated, and a second type of said output signal is substantially one of said first signal frequency-converted to said third center frequency $f_3$ and said second signal frequency-converted to said third center frequency $f_3$, and said second means comprises means arranged for multiplying said receive signal with a sinusoid that has a fourth center frequency $f_4$ to obtain a first mixed signal, means arranged for multiplying said receive signal with a second sinusoid to obtain a second mixed signal, wherein said second sinusoid has the same center frequency $f_4$ as said first sinusoid and differs from said first sinusoid by a first phase shift, means arranged for phase shifting one of said first and second mixed signals with a second phase shift to obtain a phase-shifted mixed signal, and means arranged for combining said phase-shifted mixed signal and said other mixed signal to obtain a combined signal, and means arranged for outputting said combined signal as said second type of said output signal.

According to an embodiment of the present invention, at least two types of output signals can be generated, and said second type of said output signal is substantially said first signal frequency-converted to said third center frequency $f_3$, said receiver further comprising means arranged for determining a quality of said first signal, and means arranged for determining at least in partial dependence on said determined quality which of said at least two types of said output signal is generated as output signal.

According to an embodiment of the present invention, said second means comprises a mixer that frequency-converts an input signal by a frequency difference $f_{LO}$ to an intermediate frequency $f_{IF}$ and can be controlled to reduce an influence of an image signal on said frequency down-converted input signal, and said image signal has a center frequency equaling one of $f_{LO}-f_{IF}$ and $f_{LO}+f_{IF}$.

According to an embodiment of the present invention, said second means further comprises means arranged for inputting said receive signal into said mixer.

According to an embodiment of the present invention, said first means comprises a first antenna for receiving a signal that contains said first and second signal to obtain a first received signal, said first antenna is at least partially adapted to said first signal, a second antenna for receiving said signal that contains said first and second signal to obtain a second received signal, said second antenna is at least partially adapted to said second signal, a first filter structure for filtering said first received signal to obtain a first filtered signal, said first filter structure is at least partially adapted to said first signal, a second filter structure for filtering said second received signal to obtain a second filtered signal, said second filter structure is at least partially adapted to said second signal, and means arranged for combining said first and second filtered signals to obtain said receive signal.

According to an embodiment of the present invention, said first filter structure comprises a band-pass filter, and said second filter structure comprises a combination of a low-pass and a high-pass filter.

According to an embodiment of the present invention, said first means comprises a dual frequency antenna for receiving a signal that contains said first and second signal to obtain a received signal, a first filter structure for filtering said received signal to obtain a first filtered signal, wherein said first filter structure is at least partially adapted to said first signal, a second filter structure for filtering said received signal to obtain a second filtered signal, wherein said second filter structure is at least partially adapted to said second signal, and means arranged for combining said first and second filtered signals to obtain said receive signal.

According to an embodiment of the present invention, said first and second signals are spread spectrum signals that have been spread with different spreading codes, respectively, said receiver further comprising means arranged for frequency-converted said output signal to a base band center frequency to obtain a base band signal, and means arranged for detecting said first and second signals in said base-band signal by correlation with their corresponding spreading codes.

It is further proposed a module for dual frequency reception in a receiver, said module comprising: first means arranged for obtaining a receive signal that contains a first signal with a first center frequency $f_1$ and a second signal with a second center frequency $f_2$; and second means arranged for processing said receive signal to generate an output signal, wherein one or more types of said output signal can be generated, and wherein a first type of said output signal is proportional to the sum of said first signal frequency-converted to a third center frequency $f_3$ and said second signal frequency-converted to said third center frequency $f_3$.

These and other aspects of the invention will be apparent from and elucidated with reference to the embodiments described hereinafter.

DETAILED DESCRIPTION OF THE INVENTION

As an initial remark, it should be noted that the subject-matter of the introductory part of this patent specification may be used to support this detailed description.

The present invention proposes to feed a controllable image rejection mixer with a receive signal that contains a first and a second signal, wherein the mixer frequency of said controllable image rejection mixer is chosen to lie between the center frequencies of said first and second mixer and wherein the image rejection capability of the controllable image rejection mixer can be controlled. This allows to generate either an output signal that is proportional to the sum of said first and second signal frequency-converted to an intermediate frequency, or to generate an output signal that is substantially only one single of said first and second signal frequency-converted to said intermediate frequency. In the former case, signal properties such as for instance the property that the first and second signals are spread spectrum signals are exploited to detect and/or recover the first and second signal from the sum signal.

Figure 1:
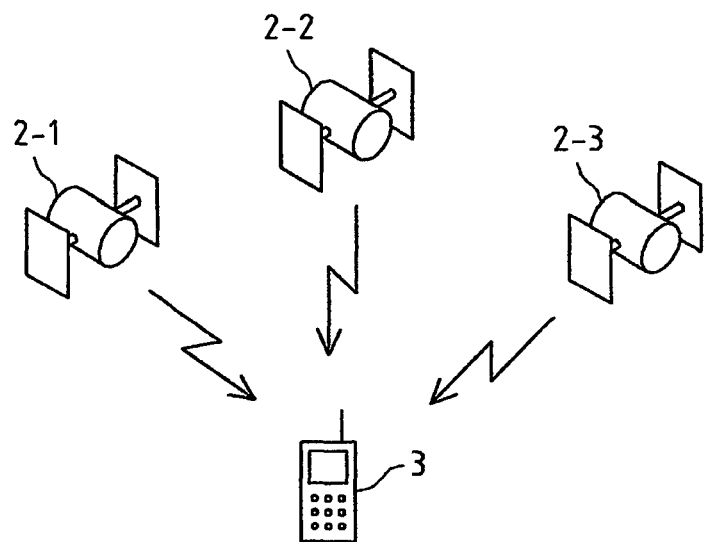
FIG. 1: A schematic presentation of a satellite-based positioning system according to an embodiment of the present invention.

FIG. 1 schematically depicts a satellite-based positioning system 1, wherein a plurality of satellites 2-1 . . . 2-3 transmit positioning signals to a receiver 3, wherein each of said positioning signals contains a first and a second signal with respective first and second center frequencies, and wherein said first and second signals are spread spectrum signals. With respect to each satellite 2-1 . . . 2-3, the signals of which said receiver 3 is able to receive, for instance satellite 2-1, the receiver 3 receives a receive signal that contains said first and second signal transmitted by said satellite 2-1, and processes the receive signal to determine the satellite's identity and the distance to said satellite 2-1. Based on the satellite's identity, the receiver can determine the satellite's position, and, if the distance and position of at least three satellite's have been determined by the receiver 3, it is able to determine its own position by means of triangulation. Reception of the signals of a fourth satellite may be exploited to account for timing errors stemming from the digital clock used at the receiver 3. Wherein detection of the first signal transmitted by each of said satellites may be sufficient to determine the receiver's position, additional reception of the second signal may be exploited to enhance the accuracy of the positioning, for instance by eliminating the propagation delay that is induced by the ionosphere and that can be determined if signals transmitted at dual frequencies are available to said receiver 3.

The satellites 2-1 . . . 2-3 may for instance be satellites of the of the Global Positioning System (GPS) or the Galileo system, and the receiver 3 may be capable of receiving and processing signals transmitted by satellites of both systems concurrently. For instance, said receiver 3 may receive the first signal with the first center frequency of satellite 2-1 which is operated according to the GPS, and concurrently may receive the second signal with the second center frequency of satellite 2-2 which is operated according to the Galileo system.

Figure 2:
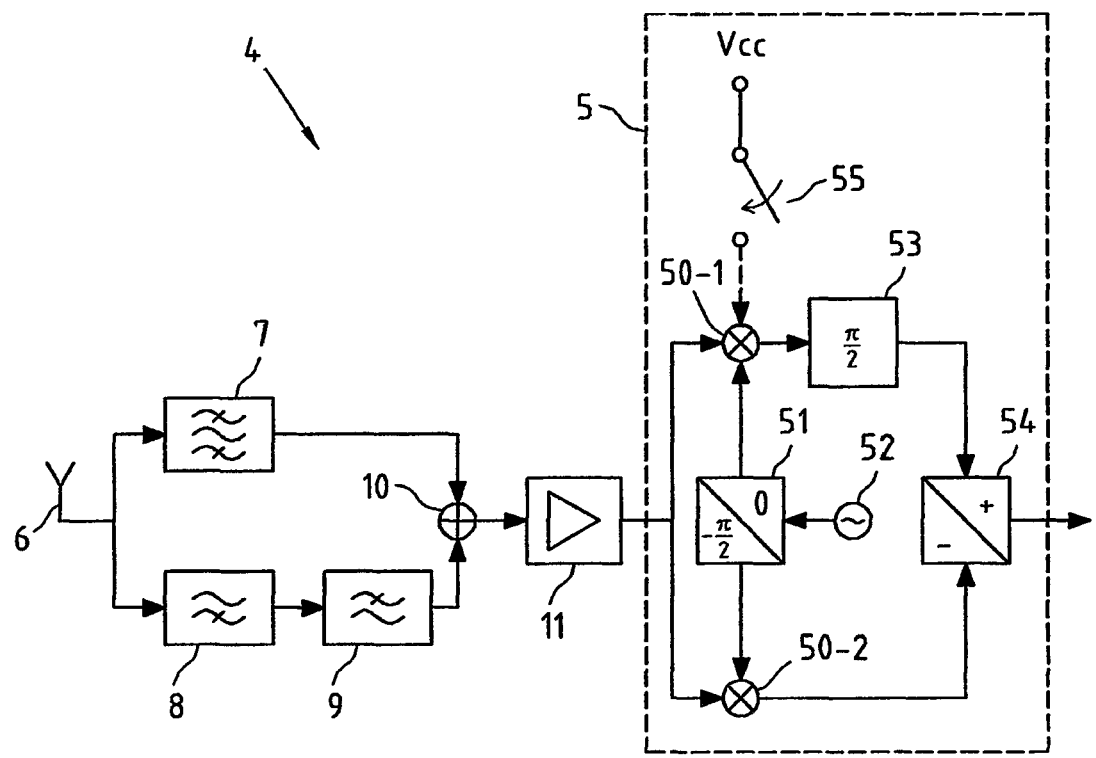
FIG. 2: a schematic presentation of a Radio Frequency (RF) and Intermediate Frequency (IF) section of a receiver according to an embodiment of the present invention.

FIG. 2 schematically depicts an architecture 4 comprising the Radio Frequency (RF) section, also called the front-end, and the Intermediate Frequency (IF) section of a dual frequency receiver according to an embodiment of the present invention. Said architecture may equally well be encapsulated into a module, which then, eventually with further components, may be integrated into or connected to a receiver, for instance a mobile phone or a lap top, to allow for dual frequency reception therein.

The architecture 4 comprises a dual frequency antenna 6 for receiving the receive signal that comprises the first and second signal, a band-pass filter 7 for filtering the receive signal to isolate the first signal, a combination of a high-pass filter 8 and a low-pass filter 9 for filtering the receive signal to isolate the second signal, an adder 10 to combine the two filtered signals, and amplifier 11 for amplifying the sum signal, and a controllable image rejection mixer 5, that frequency down-converts the first and/or second signals contained in the mixer input signal at the output of the amplifier 11 and produces a mixer output signal at the output of the image rejection mixer 5, which then may be converted to a Base Band (BB) frequency and further processed (not shown in FIG. 2).

The present invention is based on the idea of down-converting the first signal with the first center frequency, also denoted as the first channel, and the second signal with the second center frequency, also denoted as second channel, on top of each other. Because all GPS (L1, L2 and L5) and Galileo satellite signals transmitted at different frequencies are spread with different spreading codes, it is nevertheless possible to detect the first and second signals even if they are down-converted to the same frequency. The cross-correlation properties of the codes are such that the performance with two aligned signals is as good as with individual signals.

The down-conversion of the two channels is done in a way minimizing the extra hardware required. This is obtained by using a down conversion mixer 5 that is in nominal case in single carrier reception mode with image frequency cancellation property, and when the two carriers are to be received, this image rejection is turned off.

The internal structure of the image rejection mixer 5 is actually having two multipliers 50-1 and 50-2, which are feed by sinusoids that are generated by a local oscillator 52 and, where applicable, phase shifted by instance 51, and a phase shifter 53 plus a combination unit 54. Therein, multiplier 50-1 can be controlled by a switch 55, for instance by separating it from its bias current Vcc.

The controllable image rejection mixer 5 functions as follows:

Denote the first and second signal as $$L_1(t)=A\cdot\cos(2\pi f_1 t)$$

and $$L_2(t)=B\cdot\cos(2\pi f_2 t),$$

respectively. If said local oscillator generates a cosine with frequency $$f_4 = f_2 + \frac{f_1 - f_2}{2},$$

and if said instance 51 imposes no phase shift on the signal that is fed into the multiplier 50-1 and a phase shift of $$-\frac{\pi}{2}$$

on the signal that is fed into multiplier 50-2 (which is a sine then), the signal $I_1(t)$ at the output of multiplier 50-1 can be expressed as:

$$\begin{aligned}I_1(t) &= (L_1(t) + L_2(t))\cdot\cos(2\pi f_4 t)\\ &= -\frac{A}{2}\sin(2\pi(f_1-f_4)t) + \frac{B}{2}\sin(2\pi(f_4-f_2)t)\end{aligned}$$

and the signal $I_2(t)$ at the output of multiplier 50-2 can be expressed as:

$$\begin{aligned}I_2(t) &= (L_1(t) + L_2(t))\cdot\sin(2\pi f_4 t)\\ &= \frac{A}{2}\cos(2\pi(f_4-f_1)t) + \frac{B}{2}\cos(2\pi(f_4-f_2)t)\end{aligned}$$

The signal $I_3(t)$ at the output of the phase shifter 53

(phase shift $\frac{\pi}{2}$)

then can be expressed as:

$$I_3(t) = \frac{A}{2}\cos(2\pi(f_1-f_4)t) - \frac{B}{2}\cos(2\pi(f_4-f_2)t).$$

Consider now the following three cases:
a) Switch 55 is turned off, no image rejection is performed. The output signal $I_{IF}^{(a)}(t)$ of the controllable image rejection mixer 5 then is given as $$I_{IF}^{(a)}(t) = I_2(t) = \frac{A}{2}\cos(2\pi f_3 t) + \frac{B}{2}\cos(2\pi f_3 t),$$

i.e. the first and second signal have been shifted to frequency $f_3=f_1-f_4=f_4-f_2$, summed and attenuated by 3 dB.

b) Switch 55 is turned on, image rejection is performed, and signals $I_3(t)$ (at the output of phase shifter 53) and $I_2(t)$ (at the output of multiplier 50-2) are combined in the combination unit 54 by addition. The output signal $I_{IF}^{(b)}(t)$ of the controllable image rejection mixer 5 then is given as $$I_{IF}^{(b)}(t)=I_2(t)+I_3(t)=A\cdot\cos(2\pi f_3 t),$$

i.e. the first signal has been shifted to frequency $f_3=f_1-f_4$ and the second signal has been suppressed.

c) Switch 55 is turned on, image rejection is performed, and signals $I_3(t)$ (at the output of phase shifter 53) and $I_2(t)$ (at the output of multiplier 50-2) are combined in the combination unit 54 by subtracting $I_3(t)$ from $I_2(t)$. The output signal $I_{IF}^{(c)}(t)$ of the controllable image rejection mixer 5 then is given as $$I_{IF}^{(c)}(t)=I_2(t)-I_3(t)=B\cdot\cos(2\pi f_3 t),$$

i.e. the second signal has been shifted to frequency $f_3=f_4-f_2$, and the first signal has been suppressed.

It should be noted that the output signal of the mixer according to case c) can also be achieved by summing $I_3(t)$ and $I_2(t)$, and using a phase shift of $$-\frac{\pi}{2}$$

in the phase shifter 53. It is readily understood that the desired image rejection can also be achieved when the phase shifter 53 is located in the lower branch of the mixer 5, or when different phase shifts in the phase shifter instance 51 are used, as long as the phase shifter instance 51, the phase shifter 53 and the combination unit 54 are configured accordingly.

In practice, image rejection as performed in the above cases b) and c) can not completely be achieved due to imperfections of the image rejection mixer 5. However, an image rejection of the first/or second signal of about 20 . . . 40 dB can be achieved. Since first and second signals are transmitted at a relative power level difference of only a couple of dBs, this image rejection is still large enough not to cause performance degradation during exclusive reception of the first signal (case b)) or exclusive reception of the second signal (case c)).

Figure 3A:
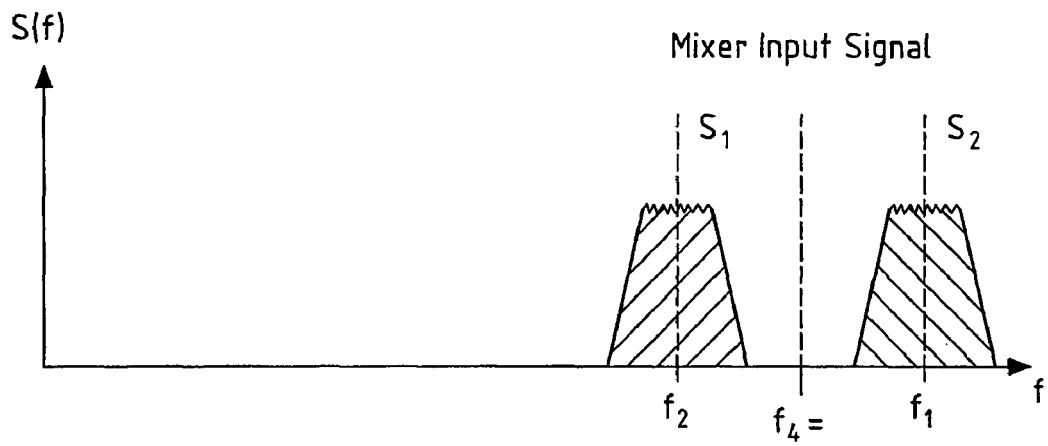
FIG. 3a: a schematic presentation of the frequency spectrum of the mixer input signal according to an embodiment of the present invention.
Figure 3B:
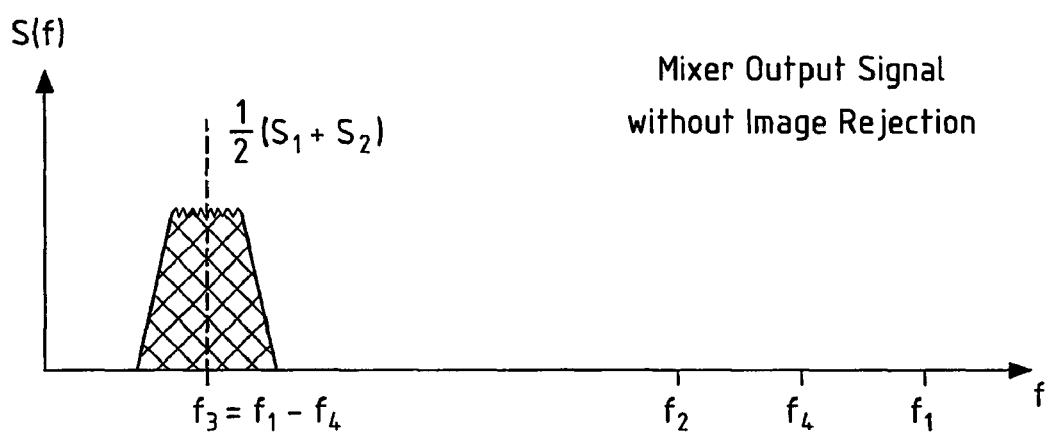
FIG. 3b: a schematic presentation of the frequency spectrum of the mixer output signal when image rejection is turned off according to an embodiment of the present invention.
Figure 3C:
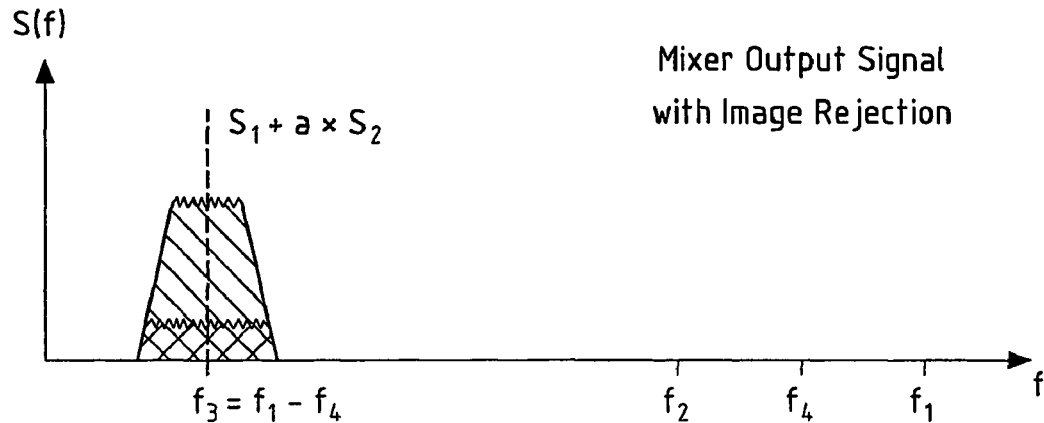
FIG. 3c: a schematic presentation of the frequency spectrum of the mixer output signal when image rejection is turned on according to an embodiment of the present invention.

This is considered in FIGS. 3*a*-3*c*, wherein in FIG. 3*a*, the frequency spectra $S_1$ and $S_2$ of the first and second signals with respective center frequencies $f_1$ and $f_2$ are depicted together with the local oscillator frequency $$f_4 = f_2 + \frac{f_1 - f_2}{2}$$

lying between said both frequencies. FIG. 3*b* depicts the case a) when mixing of the first and second signals is performed without image rejection and both spectra $S_1$ and $S_2$ are shifted to the intermediate frequency $f_3$ and there jointly superposed and attenuated by 3 dB, as indicated by the cross hatch. FIG. 3*c* finally depicts the case b) when mixing of the first and second signals is performed with image rejection and both spectra $S_1$ and $S_2$ are shifted to the intermediate frequency $f_3$, but the spectrum of the second signal is attenuated by the image rejection by a factor a that amounts 20 . . . 40 dB.

According to an embodiment of the present invention, when dual frequency reception of both the first and second signal is needed, the image rejection is turned off by switch 55 (case a)). This means that the multiplier 50-1 is turned off by shutting down the bias current Vcc. Alternatively, other components of the multiplier or the entire upper branch of the controllable image rejection mixer 5 may be switched off. Therein, the first alternative of shutting down the bias current may be the most feasible approach. The controllable image rejection mixer 5 then operates as an ordinary mixer having no image rejection at all.

This means that the first and second signal, are down converted on top of each other, i.e. the first signal aliases on top of the second signal or vice versa. In this case the local oscillator frequency is $$f_4 = f_2 + \frac{f_1 - f_2}{2}$$

causing the intermediate frequency to be $f_3=f_1-f_4=f_4-f_2'$.

If said first and second signals are for instance the L1 band and L2 band signals of the GPS with center frequencies $f_1=1575.4$ MHz and $f_2=1227$ MHz, respectively, the local oscillator frequency is $f_4=1401.5$ MHz, and the resulting intermediate frequency is $f_3=174$ MHz.

The intermediate frequency $f_3$ at the output of the mixer 5 can then be translated to base band (approximately zero frequency) either by digital means or using another down conversion mixer stage.

If any other signal (for instance the L5 signal) is to be used as second signal, or if the frequency of said second signal changes, the frequency of the local oscillator within the controllable image rejection mixer 5 can be changed to match the new frequency.

For instance, to cover all GPS and Galileo signals, the tuning range of this local oscillator should be from 1375 MHz to 1401.5 MHz.

The front-end structure of the architecture 4 in FIG. 2 consists of two branches, wherein the first branch, comprising the band-pass filter 7, can be considered as main branch, and wherein the second branch, comprising the high-pass filter 8 and the low-pass filter 9, can be considered as secondary branch. This may for instance be due to the fact that the first signal, which is filtered in the main branch, is transmitted with a higher power level than the second signal that is filtered in the secondary branch. It should be noted that it is also possible that instead of the dual frequency antenna, separate antennas for each of said two branches are used, wherein these separate antennas then may be tuned to the center frequencies of the first and second signal, respectively.

If the dual frequency reception of both the first and second signal is only required occasionally, for instance because the information of the first signal is considered to be sufficient for positioning and because the second signal provides information that is only eventually required, it may be advantageous to switch between dual frequency reception and single frequency reception. This is due to the fact that, when performing dual frequency reception, imperfect separation of the first signal from the sum of the first and second signal that is output by the mixer 5 and then converted to base band may degrade the Signal-to-Noise Ratio (SNR) of the first signal. If the SNR of the first signal is already at the sensitivity level, it is thus advantageous to avoid dual frequency reception. Dual frequency reception can be performed if the SNR of the first signal is found to be high enough to sustain a slight degradation due to said imperfect separation of said second signal in base band. The SNR of the first signal may for instance be measured or estimated in the main branch. The front-end filtering in the secondary branch can be designed to consist of only a low pass filter 9 and a high pass filter 8. This is due to the fact that the sensitivity of the secondary branch may not be of primary importance as it is used only in the high SNR regime. In case of the GPS and Galileo system, the frequency response of the filter in the secondary branch may then have a pass band from 1170 MHz to 1235 MHz.

The situation that the first signal is of higher importance than the second signal is for instance encountered in the GPS system, where the L1 band signal is transmitted with higher transmission power than the L2 band signal. According to an embodiment of the present invention, it is then advantageous to perform dual frequency reception only if the SNR of the L1 band signal is above the sensitivity level of the receiver. Dual frequency reception then can be exploited to determine the propagation delay induced by the ionosphere and thus to increase the accuracy of the pseudo ranges. In particular if the propagation delay induced by the ionosphere is only slowly changing in time, too frequent measurement of this quantity may not be required anyway.

Figure 4:
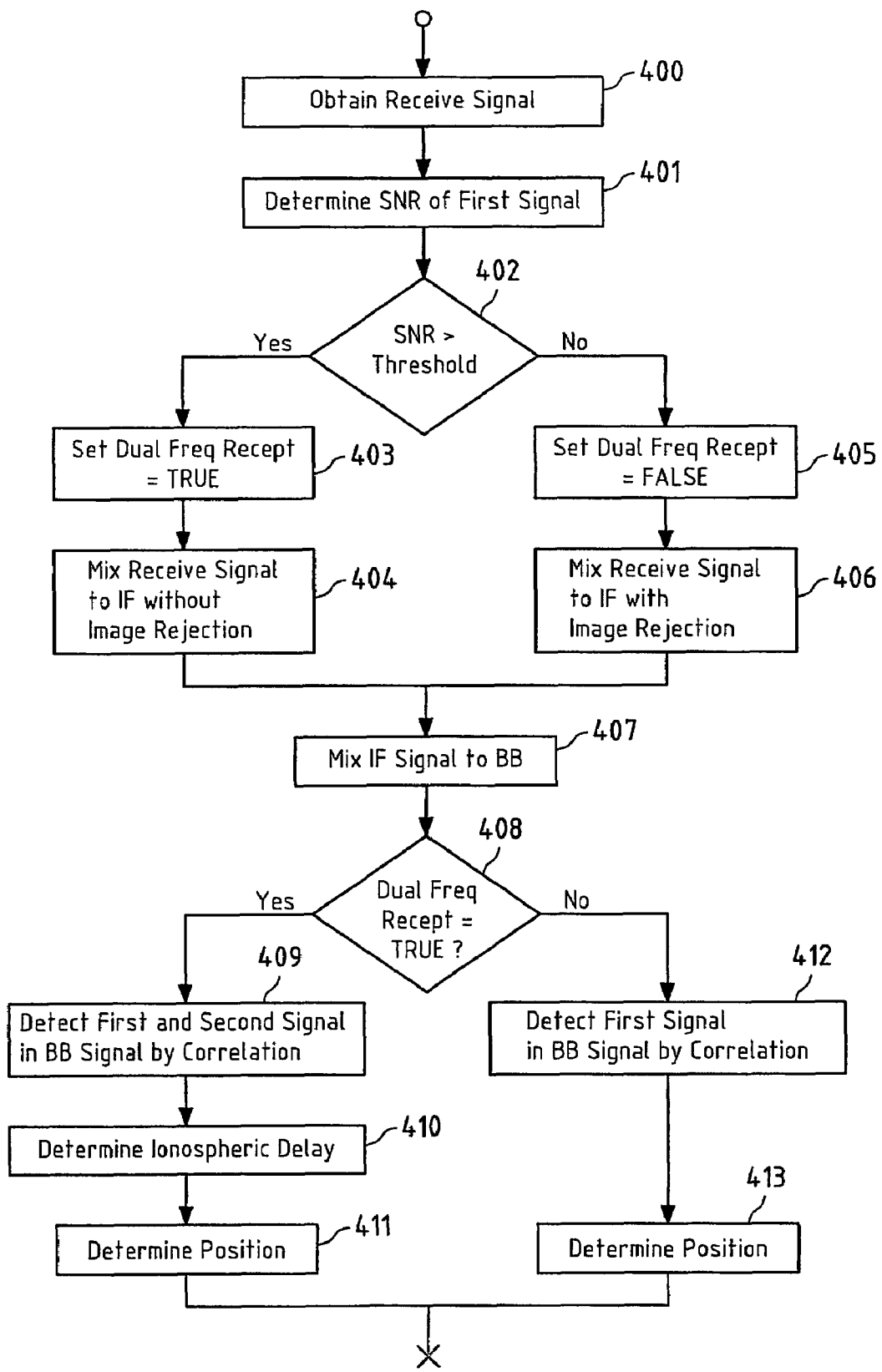
FIG. 4: an exemplary flowchart of a method for dual frequency reception according to an embodiment of the present invention.

FIG. 4 depicts an exemplary flowchart of a method for dual frequency reception according to an embodiment of the present invention.

In a first step 400, a receive signal is obtained by a receiver, wherein said receive signal contains a first and a second signal with different center frequencies. This may for instance be achieved via a dual frequency antenna or two separate antennas and corresponding filter structures. In a second step 401, the SNR of the first signal is determined, for instance in a primary branch of the front-end of the receiver. If this SNR is larger than a sensitivity threshold, which is checked for in step 402, a state variable DualFreqRecept is set to TRUE, and mixing of the receive signal with the controllable image rejection mixer according to an embodiment of the present invention is performed, wherein the image rejection capability of said mixer is turned off, so that both the first and second signal are superposed at the intermediate frequency. Otherwise, the state variable DualFreqRecept is set to FALSE, and mixing of the receive signal with the controllable image rejection mixer according to an embodiment of the present invention is performed, wherein the image rejection capability of said mixer is turned on, so that substantially only the first signal is frequency converted to the intermediate frequency.

Irrespective of the outcome of the check in step 402, the intermediate frequency signal as output by the mixer is then converted to base band in a step 407, yielding a base band signal. Depending on a state of the state variable DualFreqRecept, which is checked in a step 408, the base band signal processing is performed on the base band signal. If DualFreqRecept is TRUE, both the first and second signal are detected in the base band signal by correlation in a step 409. In a step 410, the propagation delay caused by the ionosphere is then determined based on the dual frequency reception of the first and second signal. This delay may then be exploited to enhance the accuracy of the positioning, which is determined in a step 411.

If DualFreqRecept is FALSE, only the first signal is detected in the base band signal by correlation in a step 412, and the position of the receiver is determined based on the detected first signal in a step 413. Therein, also a correction of the delay induced by the ionosphere may be performed, if the ionosphere that was determined in a preceding situation where the SNR was larger than the sensitivity threshold was stored in the receiver and still is up to date.

The present invention enables the reception of all existing and forthcoming navigation satellite signals without increasing the complexity of the RF hardware. This improvement is due to a novel reception concept that translates the two frequency channels on top of each other. The code division multiple access feature that is inherent to the satellite-based positioning systems due to the use of different spreading codes for the signals transmitted on different frequency carriers (and in different positioning systems) allows for this architecture. The primary advantages of the present invention are:

Efficient dual frequency reception is enabled.

Switching between single and dual carrier frequency reception is possible.

The use of dual frequency reception can be restricted to the high SNR regime in order not to degrade the performance of the reception of a more important first signal in the primary channel.

The bandwidth requirement after the controllable image rejection mixer is minimized.

For different GPS and Galileo navigation satellite signals, the received frequencies can be L1 (with a center frequency of 1575.5 MHz) and any carrier frequency from 1176 MHz to 1227 MHz, wherein this frequency range consists of all GPS and Galileo signals.

The invention has been described above by means of some embodiments. It should be noted that there are alternative ways and variations which are obvious to a skilled person in the art and can be implemented without deviating from the scope and spirit of the appended claims. In particular, the present invention is not restricted to receivers of satellite-based positioning systems. It may equally well be deployed in any other receiver that requires dual frequency reception of spread spectrum signals. Furthermore, the present invention is not restricted to dual frequency reception of the L1 and L2 signals of the GPS only. Also dual frequency reception of other combinations of the three GPS signals L1, L2 and L5 are possible, wherein in particular, the dual frequency reception of signal L2 and L5 may be particularly advantageous.

The invention claimed is:

1. A method for dual frequency reception, comprising:
obtaining a receive signal that contains a first signal with a first center frequency $f_1$ and a second signal with a second center frequency $f_2$;
processing said receive signal to generate an output signal, wherein at least two types of output signals can be generated, wherein a first type of said output signal is proportional to the sum of said first signal frequency-converted to a third center frequency $f_3$ and said second signal frequency-converted to said third center frequency $f_3$, wherein a second type of said output signal is substantially one of said first signal frequency-converted to said third center frequency $f_3$, and said second signal frequency-converted to said third center frequency $f_3$, and wherein said processing to generate said second type of said output signal comprises multiplying said receive signal with a first sinusoid that has a fourth center frequency $f_4$ to obtain a first mixed signal, multiplying said receive signal with a second sinusoid to obtain a second mixed signal, wherein said second sinusoid has the same center frequency $f_4$ as said first sinusoid and differs from said first sinusoid by a first phase shift; phase shifting one of said first and second mixed signals with a second phase shift to obtain a phase-shifted mixed signal; and combining said phase-shifted mixed signal and said other mixed signal to obtain said second type of said output signal, wherein said combining comprises one of addition and subtraction, and wherein a switching between said two signals of said second type is performed by switching between addition and subtraction.

2. The method according to claim 1, wherein said processing to generate said first type of said output signal comprises:
multiplying said receive signal with a sinusoid that has a fourth center frequency $f_4$ to obtain said first type of said output signal.

3. The method according to claim 1, wherein $f_1 \geq f_2$, $$f_4 = f_2 + \frac{f_1 - f_2}{2} \text{ and } f_3 = f_1 - f_4$$

hold.

4. The method according to claim 1, wherein said first phase shift equals $$\frac{\pi}{2}.$$

5. The method according to claim 1, wherein said second phase shift equals $$\pm \frac{\pi}{2}.$$

6. The method according to claim 1, wherein said second type of said output signal is substantially said first signal frequency-converted to said third center frequency $f_3$, wherein a quality of said first signal is determined, and wherein it is determined at least in partial dependence on said determined quality which of said at least two types of said output signal is generated as output signal.

7. The method according to claim 6, wherein said first type of said output signal is generated if said determined quality is above a threshold value.

8. The method according to claim 1, wherein said frequency $f_4$ is tunable.

9. The method according to claim 1, wherein said obtaining of said receive signal comprises:
receiving a signal that contains said first and second signal with a first antenna to obtain a first received signal, wherein said first antenna is at least partially adapted to said first signal;
receiving a signal that contains said first and second signal with a second antenna to obtain a second received signal, wherein said second antenna is at least partially adapted to said second signal;
filtering said first received signal with a first filter structure at least partially adapted to said first signal to obtain a first filtered signal;
filtering said second received signal with a second filter structure at least partially adapted to said second signal to obtain a second filtered signal; and
combining said first and second filtered signals to obtain said receive signal.

10. The method according to claim 9, wherein said first filter structure comprises a band-pass filter, and wherein said second filter structure comprises a combination of a low-pass and a high-pass filter.

11. The method according to claim 1, wherein said obtaining of said receive signal comprises:
receiving a signal that contains said first and second signal with a dual frequency antenna to obtain a received signal;
filtering said received signal with a first filter structure at least partially adapted to said first signal to obtain a first filtered signal;
filtering said received signal with a second filter structure at least partially adapted to said second signal to obtain a second filtered signal; and
combining said first and second filtered signals to obtain said receive signal.

12. The method according to claim 1, wherein said output signal is frequency converted to a base band center frequency.

13. The method according to claim 1, wherein said first and second signals are spread spectrum signals that have been spread with different spreading codes, respectively.

14. The method according to claim 13, wherein said output signal is frequency converted to a base band center frequency to obtain a base band signal, and wherein said first and second signals are detected in said base-band signal by correlation with their corresponding spreading codes.

15. The method according to claim 1, wherein said first and second signals are transmitted to said receiver by at least one transmitter of at least one satellite-based positioning system.

16. The method according to claim 15, wherein said at least one satellite-based positioning system comprises at least one of the Global Positioning System and the Galileo system.

17. The method according to claim 1, wherein said first frequency $f_1$ equals 1575.4 MHz, and wherein said second frequency $f_2$ is in the range between 1176 and 1227 MHz.

18. A computer program stored on a computer-readable medium with instructions operable to cause a processor to control a receiver that performs the method steps of claim 1.

19. A tangible computer program product comprising a computer program with instructions operable to cause a processor to control a receiver that performs the method steps of claim 1.

20. A system for transmitting signals, comprising at least one transmitter, and at least one receiver,
wherein said at least one transmitter comprises:
a transmission component configured for transmitting a signal that contains a first signal with a first center frequency $f_1$ and a second signal with a second center frequency $f_2$, and
wherein said at least one receiver comprises:
a reception component configured for obtaining a receive signal that contains said first and second signal, and
a processing component configured for processing said receive signal to generate an output signal,
wherein at least two types of output signals can be generated, wherein a first type of said output signal is proportional to the sum of said first signal frequency-converted to a third center frequency $f_3$ and said second signal frequency-converted to said third center frequency $f_3$, wherein a second type of said output signal is substantially one of said first signal frequency-converted to said third center frequency $f_3$, and said second signal frequency-converted to said third center frequency $f_3$, and wherein said processing component configured for processing said receive signal comprises:

a mixer configured for multiplying said receive signal with a first sinusoid that has a fourth center frequency $f_4$ to obtain a first mixed signal, a mixer configured for multiplying said receive signal with a second sinusoid to obtain a second mixed signal, wherein said second sinusoid has the same center frequency $f_4$ as said first sinusoid and differs from said first sinusoid by a first phase shift;

a phase shifter configured for phase shifting one of said first and second mixed signals with a second phase shift to obtain a phase-shifted mixed signal; and a combiner configured for combining said phase-shifted mixed signal and said other mixed signal to obtain said second type of said output signal, wherein said combining comprises one of addition and subtraction, and wherein a switching between said two signals of said second type is performed by switching between addition and subtraction.

21. An apparatus comprising:

a transmission component configured for transmitting a signal that contains a first signal with a first center frequency and a second signal with a second center frequency;

wherein a receive signal that contains said first and second signal is obtained by at least one receiver, wherein said receive signal is processed at said at least one receiver to generate an output signal, wherein at least two types of output signals can be generated, wherein a first type of said output signal is proportional to the sum of said first signal frequency-converted to a third center frequency $f_3$ and said second signal frequency-converted to said third center frequency $f_3$, wherein a second type of said output signal is substantially one of said first signal frequency-converted to said third center frequency $f_3$, and said second signal frequency-converted to said third center frequency $f_3$, and wherein said processing to generate said second type of said output signal comprises multiplying said receive signal with a first sinusoid that has a fourth center frequency $f_4$ to obtain a first mixed signal, multiplying said receive signal with a second sinusoid to obtain a second mixed signal, wherein said second sinusoid has the same center frequency $f_4$ as said first sinusoid and differs from said first sinusoid by a first phase shift; phase shifting one of said first and second mixed signals with a second phase shift to obtain a phase-shifted mixed signal; and combining said phase-shifted mixed signal and said other mixed signal to obtain said second type of said output signal, wherein said combining comprises one of addition and subtraction, and wherein a switching between said two signals of said second type is performed by switching between addition and subtraction.

22. An apparatus comprising:

a reception component configured for obtaining a receive signal that contains a first signal with a first center frequency $f_1$ and a second signal with a second center frequency $f_2$; and a processing component configured for processing said receive signal to generate an output signal, wherein at least two types of output signals can be generated, wherein a first type of said output signal is proportional to the sum of said first signal frequency-converted to a third center frequency $f_3$ and said second signal frequency-converted to said third center frequency $f_3$, wherein a second type of said output signal is substantially one of said first signal frequency-converted to said third center frequency $f_3$, and said second signal frequency-converted to said third center frequency $f_3$, and wherein said processing component comprises:

a mixer configured for multiplying said receive signal with a first sinusoid that has a fourth center frequency $f_4$ to obtain a first mixed signal, a mixer configured for multiplying said receive signal with a second sinusoid to obtain a second mixed signal, wherein said second sinusoid has the same center frequency $f_4$ as said first sinusoid and differs from said first sinusoid by a first phase shift;

a phase shifter configured for phase shifting one of said first and second mixed signals with a second phase shift to obtain a phase-shifted mixed signal; and a combiner configured for combining said phase-shifted mixed signal and said other mixed signal to obtain said second type of said output signal, wherein said combining comprises one of addition and subtraction, and wherein a switching between said two signals of said second type is performed by switching between addition and subtraction.

23. The apparatus according to claim 22, wherein said processing component comprises:

a mixer configured for multiplying said receive signal with a sinusoid that has a fourth center frequency $f_4$ to obtain a first mixed signal; and an output configured for outputting said first mixed signal as said first type of said output signal.

24. The apparatus according to claim 22, wherein at least two types of output signals can be generated, and wherein said second type of said output signal is said first signal frequency-converted to said third center frequency $f_3$, said apparatus further being configured for determining a quality of said first signal, and for determining at least in partial dependence on said determined quality which of said at least two types of said output signal is generated as output signal.

25. The apparatus according to claim 22, wherein said reception component comprises:

a first antenna configured for receiving a signal that contains said first and second signal to obtain a first received signal, wherein said first antenna is at least partially adapted to said first signal;

a second antenna configured for receiving said signal that contains said first and second signal to obtain a second received signal, wherein said second antenna is at least partially adapted to said second signal;

a first filter structure configured for filtering said first received signal to obtain a first filtered signal, wherein said first filter structure is at least partially adapted to said first signal;

a second filter structure configured for filtering said second received signal to obtain a second filtered signal, wherein said second filter structure is at least partially adapted to said second signal; and a combiner configured for combining said first and second filtered signals to obtain said receive signal.

26. The apparatus according to claim 25, wherein said first filter structure comprises a band-pass filter, and wherein said second filter structure comprises a combination of a low-pass and a high-pass filter.

27. The apparatus according to claim 22, wherein said reception component comprises:

a dual frequency antenna configured for receiving a signal that contains said first and second signal to obtain a received signal;

a first filter structure configured for filtering said received signal to obtain a first filtered signal, wherein said first filter structure is at least partially adapted to said first signal;

a second filter structure configured for filtering said received signal to obtain a second filtered signal, wherein said second filter structure is at least partially adapted to said second signal; and a combiner configured for combining said first and second filtered signals to obtain said receive signal.

28. The apparatus according to claim 22, wherein said first and second signals are spread spectrum signals that have been spread with different spreading codes, respectively, said apparatus further comprising:

a converter configured for frequency-converting said output signal to a base band center frequency to obtain a base band signal, and a detector configured for detecting said first and second signals in said base-band signal by correlation with their corresponding spreading codes.

29. A module for dual frequency reception in a receiver, said module comprising:

a reception component configured for obtaining a receive signal that contains a first signal with a first center frequency $f_1$ and a second signal with a second center frequency $f_2$; and a processing component configured for processing said receive signal to generate an output signal, wherein at least two types of output signals can be generated, wherein a first type of said output signal is proportional to the sum of said first signal frequency-converted to a third center frequency $f_3$ and said second signal frequency-converted to said third center frequency $f_3$, wherein a second type of said output signal is substantially one of said first signal frequency-converted to said third center frequency $f_3$, and said second signal frequency-converted to said third center frequency $f_3$, and wherein said processing component comprises:

a mixer configured for multiplying said receive signal with a first sinusoid that has a fourth center frequency $f_4$ to obtain a first mixed signal, a mixer configured for multiplying said receive signal with a second sinusoid to obtain a second mixed signal, wherein said second sinusoid has the same center frequency $f_4$ as said first sinusoid and differs from said first sinusoid by a first phase shift;

a phase shifter configured for phase shifting one of said first and second mixed signals with a second phase shift to obtain a phase-shifted mixed signal; and a combiner configured for combining said phase-shifted mixed signal and said other mixed signal to obtain said second type of said output signal, wherein said combining comprises one of addition and subtraction, and wherein a switching between said two signals of said second type is performed by switching between addition and subtraction.

30. An apparatus
comprising:

means for obtaining a receive signal that contains a first signal with a first center frequency $f_1$ and a second signal with a second center frequency $f_2$; and means for processing said receive signal to generate an output signal, wherein at least two types of output signals can be generated, wherein a first type of said output signal is proportional to the sum of said first signal frequency-converted to a third center frequency $f_3$ and said second signal frequency-converted to said third center frequency $f_3$, wherein a second type of said output signal is substantially one of said first signal frequency-converted to said third center frequency $f_3$, and said second signal frequency-converted to said third center frequency $f_3$, and wherein said means for processing said receive signal to generate an output signal comprises:

means for multiplying said receive signal with a first sinusoid that has a fourth center frequency $f_4$ to obtain a first mixed signal, means for multiplying said receive signal with a second sinusoid to obtain a second mixed signal, wherein said second sinusoid has the same center frequency $f_4$ as said first sinusoid and differs from said first sinusoid by a first phase shift;

means for phase shifting one of said first and second mixed signals with a second phase shift to obtain a phase-shifted mixed signal; and means for combining said phase-shifted mixed signal and said other mixed signal to obtain said second type of said output signal, wherein said combining comprises one of addition and subtraction, and wherein a switching between said two signals of said second type is performed by switching between addition and subtraction.

31. An apparatus
comprising:

a reception component arranged for obtaining a receive signal that contains a first signal with a first center frequency $f_1$ and a second signal with a second center frequency $f_2$; and a processing component arranged for processing said receive signal to generate an output signal, wherein at least two types of output signals can be generated, wherein a first type of said output signal is proportional to the sum of said first signal frequency-converted to a third center frequency $f_3$ and said second signal frequency-converted to said third center frequency $f_3$, wherein a second type of said output signal is substantially one of said first signal frequency-converted to said third center frequency $f_3$, and said second signal frequency-converted to said third center frequency $f_3$, and wherein said processing component comprises:

a mixer arranged for multiplying said receive signal with a first sinusoid that has a fourth center frequency $f_4$ to obtain a first mixed signal, a mixer arranged for multiplying said receive signal with a second sinusoid to obtain a second mixed signal, wherein said second sinusoid has the same center frequency $f_4$ as said first sinusoid and differs from said first sinusoid by a first phase shift;

a phase shifter arranged for phase shifting one of said first and second mixed signals with a second phase shift to obtain a phase-shifted mixed signal; and a combiner arranged for combining said phase-shifted mixed signal and said other mixed signal to obtain said second type of said output signal, wherein said combining comprises one of addition and subtraction, and wherein a switching between said two signals of said second type is performed by switching between addition and subtraction.

* * * * *

UNITED STATES PATENT AND TRADEMARK OFFICE
CERTIFICATE OF CORRECTION

PATENT NO.        : 7,446,704 B2                                      Page 1 of 1
APPLICATION NO.   : 11/664228
DATED             : November 4, 2008
INVENTOR(S)       : Niko Kiukkonen It is certified that error appears in the above-identified patent and that said Letters Patent is hereby corrected as shown below:

In column 19, line 13 (claim 3, line 1) "$f_4=$" should be deleted.

Signed and Sealed this

Third Day of March, 2009

JOHN DOLL
*Acting Director of the United States Patent and Trademark Office*